United States Patent
Williams

(10) Patent No.: US 6,170,780 B1
(45) Date of Patent: Jan. 9, 2001

(54) TWIN ENGINE AIRCRAFT

(76) Inventor: Sam Barlow Williams, 1625 Lochridge, Bloomfield Hills, MI (US) 48302

(*) Notice: Under 35 U.S.C. 154(b), the term of this patent shall be extended for 0 days.

(21) Appl. No.: 09/143,047

(22) Filed: Aug. 28, 1998

Related U.S. Application Data

(63) Continuation-in-part of application No. 08/897,771, filed on Jul. 21, 1997, now Pat. No. 5,957,405.

(51) Int. Cl.$^7$ .................................................. B04D 27/16
(52) U.S. Cl. ................................ 244/15; 244/54; 244/55
(58) Field of Search ............................ 244/15, 55, 53 B, 244/54

(56) References Cited

U.S. PATENT DOCUMENTS 3,113,636 * 12/1963 Brown et al. .......................... 244/55
3,455,523 * 7/1969 Hertel ..................................... 244/55

FOREIGN PATENT DOCUMENTS

207347 * 9/1966 (SE) ...................................... 244/55

* cited by examiner

Primary Examiner—Galen L. Barefoot
(74) Attorney, Agent, or Firm—Lyon P.C.

(57) ABSTRACT

A jet aircraft has an elongated fuselage with an intermediate section of maximum lateral cross section, a generally conical aft fuselage section of relatively smaller cross section and a single vertical stabilizer extending upwardly from the aft fuselage section. The aircraft's propulsion engines are mounted on the vertical stabilizer with the air inlets thereof spaced from the fuselage and vertical stabilizer yet disposed entirely within a rearward projection of the lateral cross section of the intermediate fuselage section thereby to preclude the ingestion of foreign objects into the engines while minimizing the effect of boundary layer airflow.

2 Claims, 3 Drawing Sheets

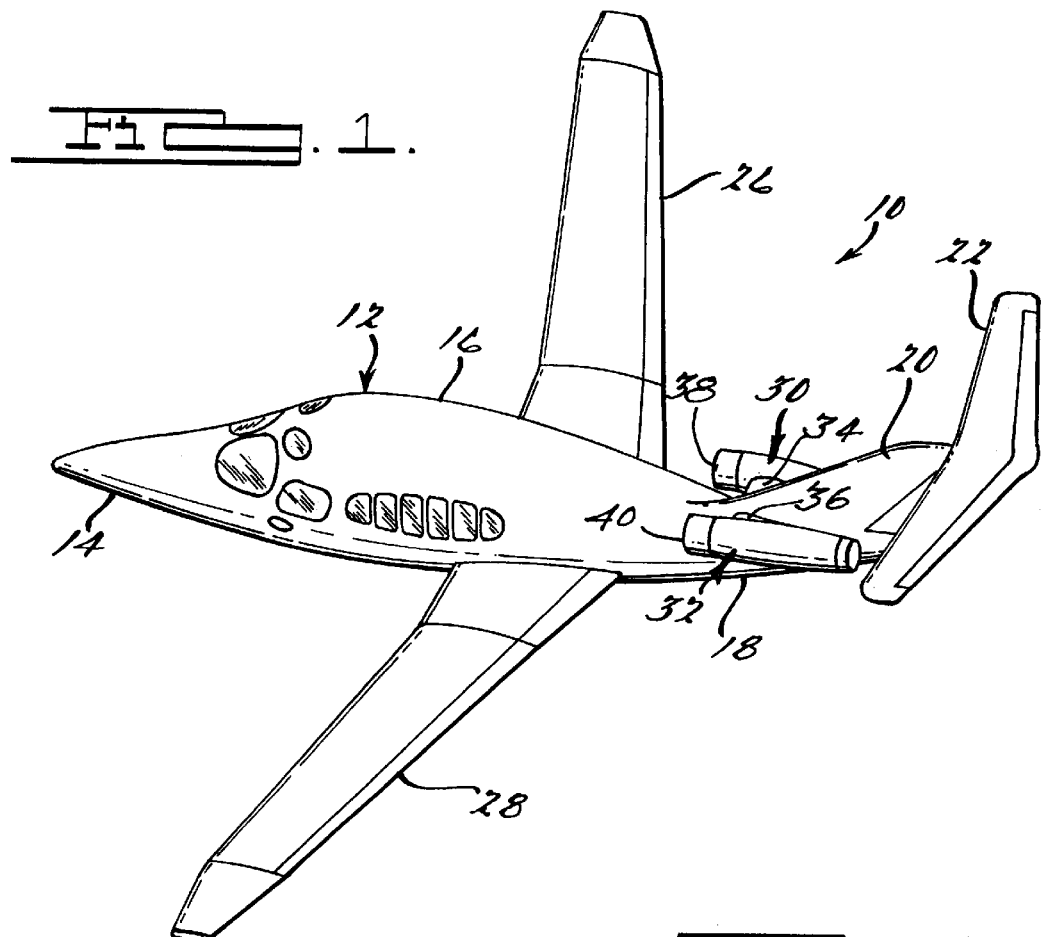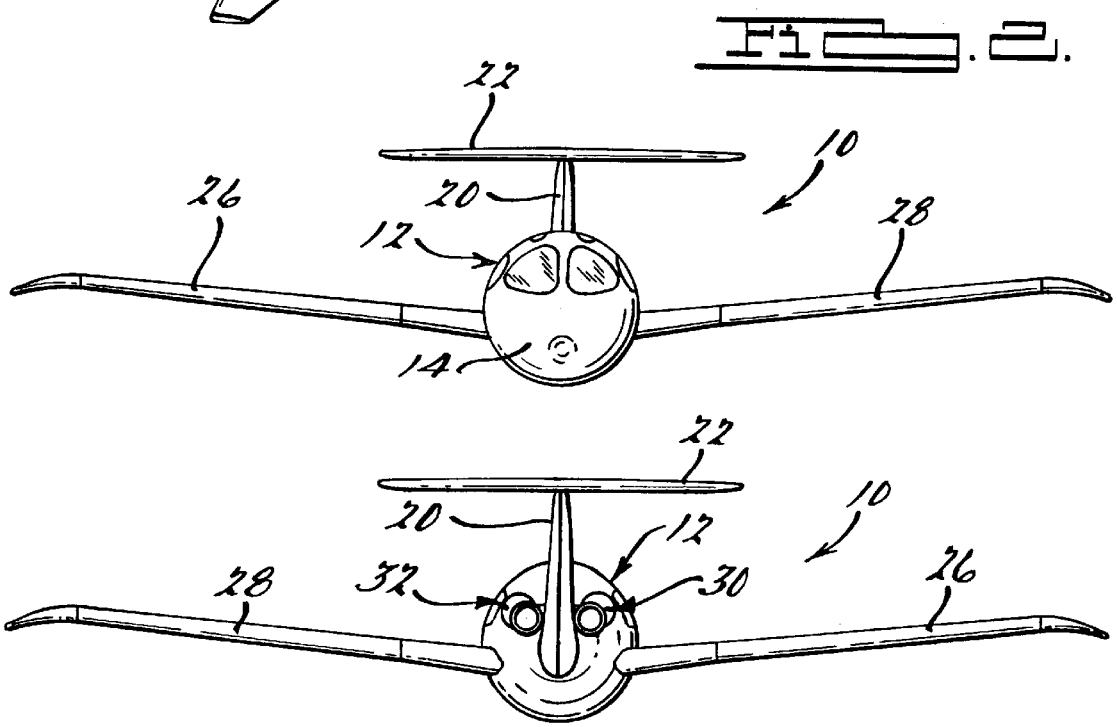

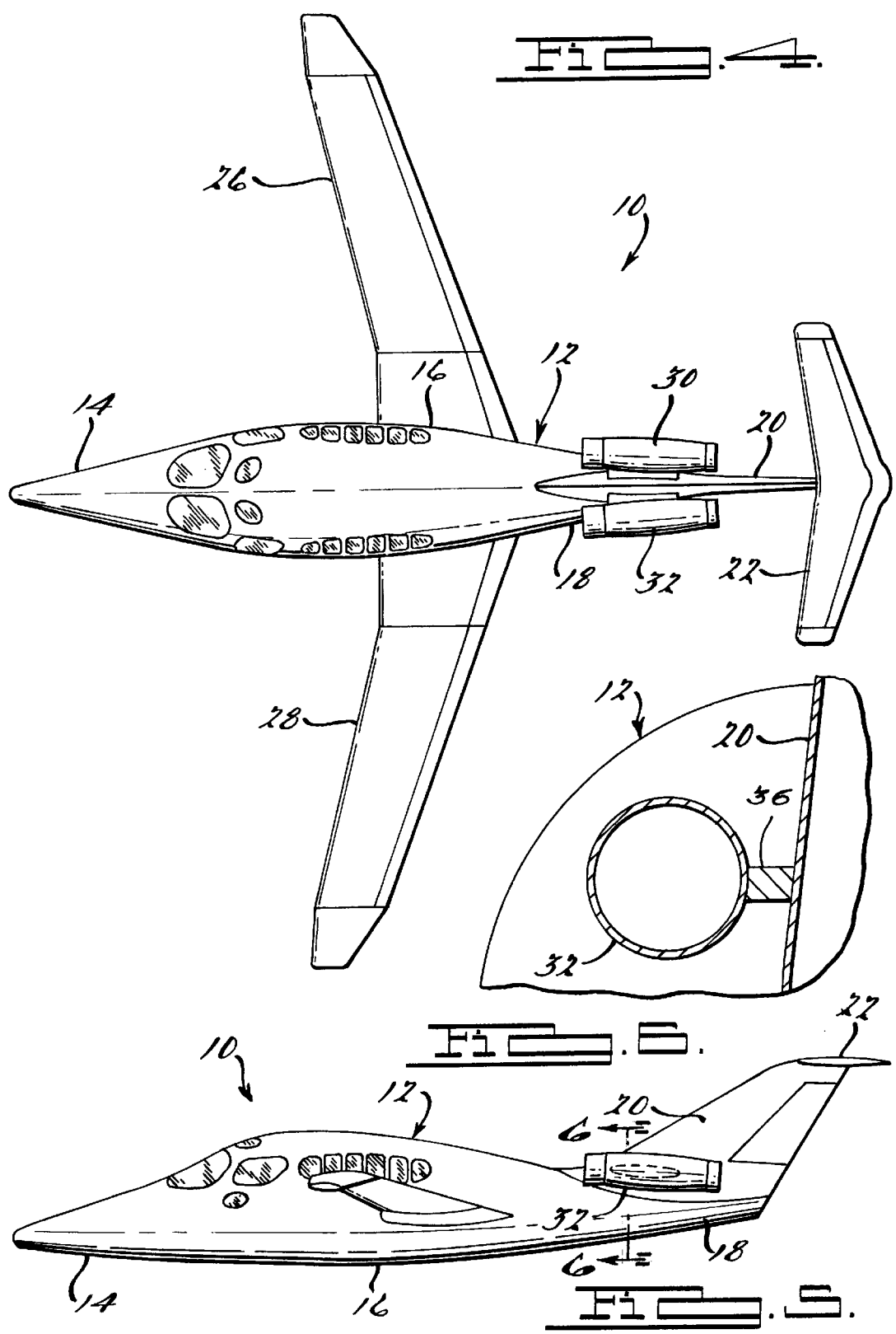

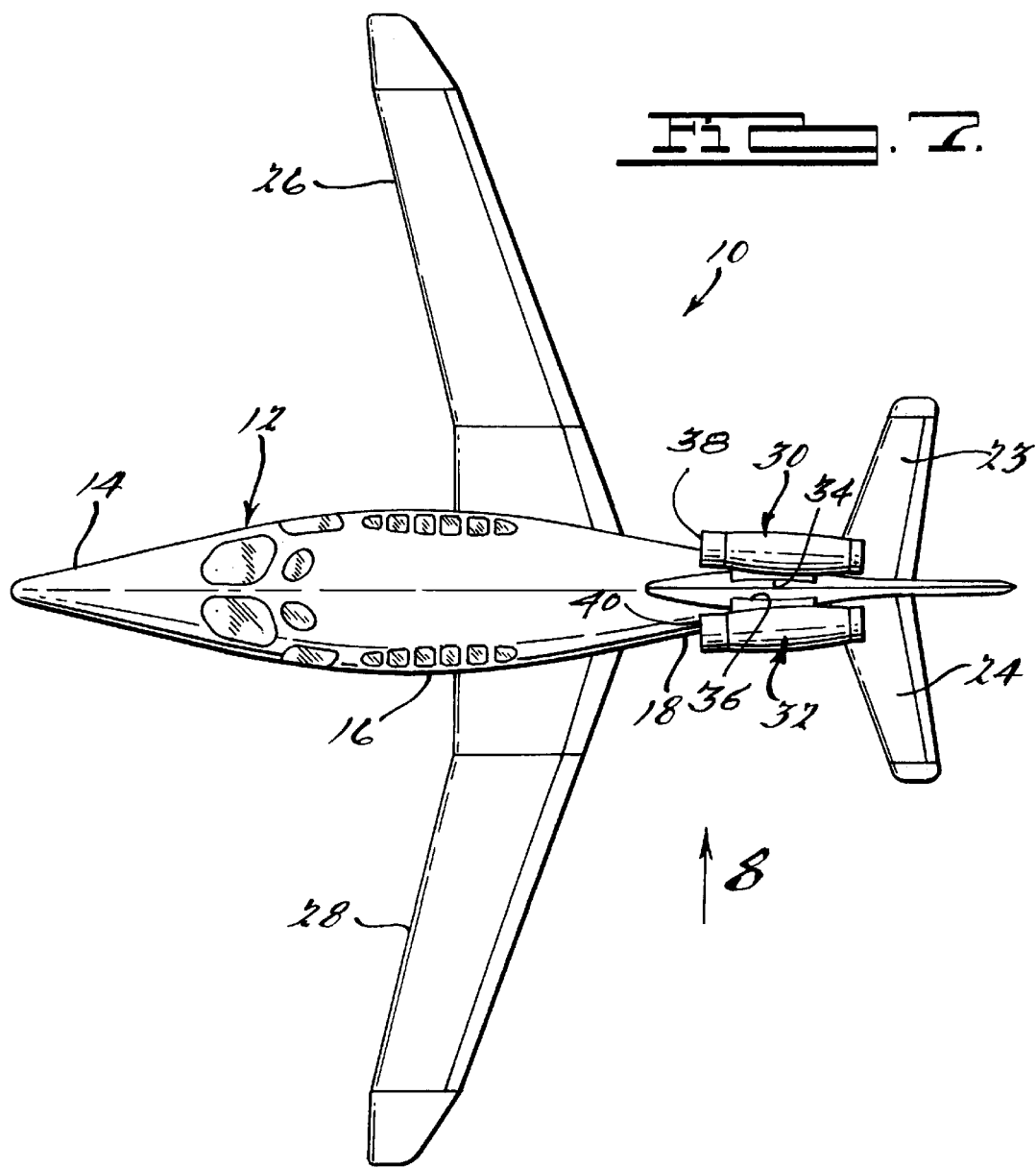
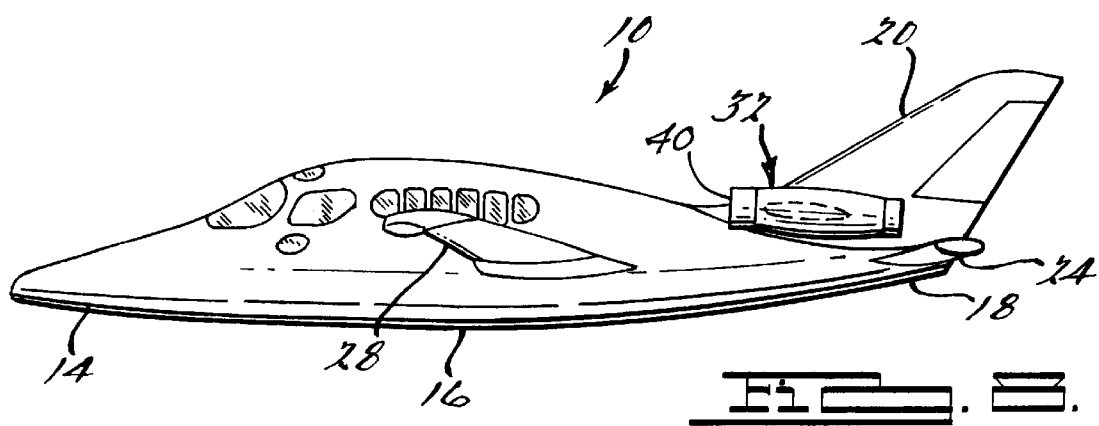

TWIN ENGINE AIRCRAFT

This application is a continuation-in-part of my application, Ser. No. 08/897,771 filed Jul. 21, 1997 now U.S. Pat. No. 5,957,405.

The present invention relates to an aircraft having an airframe configuration, engine orientation and engine mounting that precludes the ingestion of foreign objects, for example, birds, into the aircraft's engines yet maximizes the flow of air to the engine inlets of the aircraft.

BACKGROUND OF THE INVENTION

The propulsion system of an aircraft must be capable of ingesting foreign objects without engine damage. The problem of foreign object ingestion has been solved in the past by merely increasing the strength of the engine components exposed to impact damage. However, strength can be equated with weight, which, in turn, compromises performance of the aircraft. Reconciliation of such seemingly divergent performance and safety requirements requires careful integration of the aircraft's propulsion system with airframe aerodynamics.

The basic model of air flow past an aircraft fuselage assumes that air viscosity acts over a relatively thin region, inwardly of the free or external stream, termed the boundary layer. The boundary layer exists in several states, namely, laminar, turbulent, and wake. In the laminar state, flow is stratified. Farther aft, laminar flow transforms into a turbulent state which is eddying in character. Turbulent flow subsequently transforms into a wake wherein the direction of flow may actually reverse. While careful aerodynamic design can cause the boundary layer, whether laminar or turbulent, to remain attached to the aft fuselage to a point beyond the engine air inlets, orientation of the aircraft engine in a manner that precludes ingestion of relatively heavy foreign objects, for example, birds presents a more difficult problem.

SUMMARY OF THE INVENTION

The present invention is based on the premise that relatively heavy objects tend to flow rearwardly of the aircraft outside the cylindrical surface defined by the maximum cross section of the fuselage due to their large inertia forces. Accordingly, the engines of the jet aircraft of the present invention are mounted on pylons extending from the vertical stabilizer of the aircraft with the engine air inlets positioned within a rearward projection of the maximum lateral cross section of the center section of the fuselage so that ingestion of foreign objects into the engine air inlets is precluded. Air flow to the engines is maintained by orientating the engine inlets in the external stream between boundary layer air flow and said rearward fuselage projection.

More specifically, the jet aircraft of the present invention solves the problem of foreign object ingestion by utilizing a conical aft fuselage or tail cone that, in a lateral plane containing the engine inlets, is significantly smaller in radial cross section than the maximum cross section of the main fuselage section thereby permitting the engine air inlets to be positioned within a rearward projection of said maximum fuselage cross section. Engine inlet airflow is optimized by mounting the engines on pylons in spaced relation to the vertical stabilizer so as to permit boundary layer air to pass between the vertical stabilizer and the engine air inlets.

BRIEF DESCRIPTION OF THE DRAWINGS

FIG. 1 is a perspective view of a "T-tail" aircraft in accordance with embodiment of the present invention;

FIG. 2 is a front view of the aircraft of FIG. 1;

FIG. 3 is a rear view of the aircraft of FIG. 1;

FIG. 4 is a top plan view of the aircraft of FIG. 1;

FIG. 5 is a side elevational view of the aircraft of FIG. 1;

FIG. 6 a view taken along the line 6—6 of FIG. 5;

FIG. 7 is a view, similar to FIG. 4, of the invention applied to an aircraft having conventional vertical and horizontal stabilizers; and FIG. 8 is a view taken in the direction of the arrow "8" of FIG. 7.

DETAILED DESCRIPTION OF THE PREFERRED EMBODIMENT(S)

As seen in the drawings, a twin engine jet aircraft 10, comprises a fuselage 12 having a generally conical nose section 14, a generally cylindrical center section 16, and a generally conical aft fuselage section or tail cone 18. In accordance the embodiment of the invention seen in FIGS. 1–5, the aircraft 10 has a vertical stabilizer 20 with a horizontal stabilizer 22 at the top thereof in a configuration. Alternatively, as seen in FIG. 7 and 8 conventional horizontal stabilizers 23 and 24 are mounted on the vertical stabilizer 20. In both embodiments, forwardly swept wings 26 and 28 are joined to the fuselage 12 at the aft end of the center section 16, thereof.

In accordance with the present invention, a pair of jet engines 30 and 32 are mounted on pylons 34 and 36 extending from the vertical stabilizer 20. The engines 30 and 32 have air inlets 38 and 40, respectively disposed in spaced relation to the vertical stabilizer 20 but entirely within a theoretical rearward projection of the cylindrical center portion 16 of the fuselage 12.

Engine combustion air flowing externally of the boundary layer enters the engine air inlets 38 and 40 while the inertia of heavy objects forced into the external air stream by the center section 16 of the fuselage 12 will preclude ingestion thereof into the engine air inlets 38 and 40.

While the preferred embodiments of the invention have been disclosed, it should be appreciated that the invention is susceptible of modification without departing from the scope of the following claims.

I claim:

1. In a jet engine aircraft comprising a generally cylindrical intermediate fuselage section defining a passenger compartment, a generally conical aft fuselage section, and a vertical stabilizer with a fixed portion extending upwardly directly from said aft fuselage section, the improvement comprising;

a pair of propulsion engines mounted on said vertical stabilizer on opposite sides thereof and in spaced relation thereto and to said aft fuselage section, said engines having air inlets, disposed entirely within a rearward projection of the maximum lateral cross section of said intermediate fuselage section.

2. A jet engine aircraft comprising:

an elongated, generally cylindrical, fuselage having an intermediate section of maximum transverse cross section;

a generally conical aft fuselage section having a maximum transverse cross section substantially smaller than the maximum cross section of said intermediate fuselage section at the point of juncture therebetween;

a vertical stabilizer with a fixed portion extending upwardly directly from said aft fuselage section; and a pair of propulsion engines mounted on said vertical stabilizer on opposite sides thereof in spaced relation thereto and to said aft fuselage section, said engines having air inlets disposed entirely within a rearward projection of the maximum lateral cross section of said intermediate fuselage section.

\* \* \* \* \*

UNITED STATES PATENT AND TRADEMARK OFFICE
CERTIFICATE OF CORRECTION

PATENT NO.      : 6,170,780 B1
DATED           : January 9, 2001
INVENTOR(S)     : Williams It is certified that error appears in the above-identified patent and that said Letters Patent is hereby corrected as shown below:

<u>Title page,</u>
Item [73], Assignee; should read
-- Williams International Co. L.L.C.
2280 West Maple Road
Walled Lake, Michigan 48390-0200 --

Signed and Sealed this

Fifth Day of February, 2002

Attest:

Attesting Officer

JAMES E. ROGAN
*Director of the United States Patent and Trademark Office*